United States Patent [19]

Marlatt

[11] Patent Number: 4,575,448

[45] Date of Patent: * Mar. 11, 1986

[54] MODERATION OF NEUTRON ENERGY

[75] Inventor: George R. Marlatt, Monroeville, Pa.

[73] Assignee: Westinghouse Electric Corp., Pittsburgh, Pa.

[*] Notice: The portion of the term of this patent subsequent to Feb. 1, 2000 has been disclaimed.

[21] Appl. No.: 357,237

[22] Filed: Mar. 11, 1982

[51] Int. Cl.$^4$ .............................................. G21C 7/26
[52] U.S. Cl. .................... 376/209; 376/221; 376/447
[58] Field of Search ............... 376/207, 209, 219, 220, 376/221, 228, 229, 230, 327, 328, 331, 332, 347, 447; 60/546, 571, 580, 581

[56] References Cited

U.S. PATENT DOCUMENTS

| | | | |
|---|---|---|---|
| 2,499,563 | 3/1950 | Bill | 60/580 |
| 3,212,984 | 10/1965 | Tollet et al. | 376/209 |
| 3,297,537 | 1/1967 | Natland | 376/219 |
| 3,910,643 | 10/1975 | Kobashi et al. | 60/580 |
| 3,989,589 | 11/1976 | Frisch et al. | 376/230 |
| 3,991,845 | 11/1976 | LaPointe | 60/580 |
| 4,173,511 | 11/1979 | Dietrich et al. | 376/230 |
| 4,241,584 | 12/1980 | Jaecks | 60/580 |
| 4,351,153 | 9/1982 | Kosmala | 60/581 |
| 4,371,495 | 2/1983 | Marlatt | 376/209 |

Primary Examiner—Deborah L. Kyle
Assistant Examiner—Richard Klein
Attorney, Agent, or Firm—D. E. Erickson

[57] ABSTRACT

A nuclear reactor system in which the neutron-energy spectrum is displaced towards lower energy (enthalpy) by a control selectively operable by commands outside of the reactor. The core of the reactor contains, in addition to fuel assemblies, sealed tubes filled with helium. The selective control of the neutron energy spectrum includes a master cylinder having a master piston. The master cylinder is immersed in the coolant and admits the coolant through a check valve. The admitted coolant serves as hydraulic fluid of the cylinder. When the external command to shift the neutron-energy spectrum is entered, the master piston compresses the coolant in the master cylinder. The compressed coolant flows into slave cylinders displacing their slave pistons. The slave pistons carry piston rods which drive rupturing tools into engagement with the tubes rupturing the tubes and admitting the coolant which is a neutron moderator and enhances the moderaton of the neutron energy.

7 Claims, 5 Drawing Figures

MODERATION OF NEUTRON ENERGY

BACKGROUND OF THE INVENTION

This invention relates to nuclear-reactor power plants and has particular relationship to the control of the reactivity of nuclear reactors by displacement of the neutron-energy spectrum so as to enhance the flux of thermal neutrons. The effect of this displacement is to increase the number of neutrons whose energy is in the thermal range and to decrease the number of neutrons whose energy is in the epithermal range. The neutrons whose energy is in the thermal range are in thermal equilibrium with the coolant in the reactor. This invention deals predominantly with reactors whose coolant is light water, an effective moderator. To the extent that this invention is applicable to reactors with other coolants, for example, reactors whose coolant is deuterium oxide, such application is within the scope of this invention.

In addition to involving reactors whose coolant is light water, this invention involves reactors whose core includes sealed tubes containing a gas which may be helium or any other gas which does not deleteriously affect the reactor. The moderation characteristic or property of the gas is different and substantially less than that of the coolant. To change the moderation of the reactor, the tubes are ruptured and the gas in the tubes is replaced by coolant increasing the moderation. Such a reactor is disclosed in application U.S. Pat. No. 4,371,495, granted Feb. 1, 1983 to George R. Marlatt and assigned to Westinghouse Electric Corporation (herein Marlatt patent). The Marlatt patent is incorporated by reference in the instant application. In the reactor disclosed in Marlatt patent, sealed gas-filled tubes are interposed in all or some fuel assemblies and are mounted between the upper and lower nozzles of each assembly. The upper nozzle of each assembly which includes the tubes carries spikes or knives each displaced a short distance from the top of a corresponding tube. The tubes are automatically ruptured in the course of operation of the reactor. As the reactor operates and the tubes are bombarded by neutrons, they swell. Ultimately, the tubes reach a height such that their tops are engaged by the spikes and are ruptured. Coolant replaces the gas in the ruptured tubes and the moderation of the neutrons is increased.

The tubes in Marlatt's reactor swell at diferent rates under neutron bombardment so that the changes in moderation are moderate and a high thermal power increase does not occur. It is desirable that the change in moderation by rupture of tubes be controlled methodically by selective commands of an operator with the reactor system appropriately set to avoid excessive reaction to the interruption. It is an object of this invention to achieve this objective and to provide a nuclear-reactor system whose moderation is changed by rupture of tubes in the core but wherein the rupture of the tubes shall be controlled by control command facilities outside of the reactor pressure vessel. It is required that the rupturing be accomplished with a minimum penetration of the pressure vessel and that the rupturing mechanism be failsafe. It is also desirable that the mechanism be capable of being installed in reactors in current operation.

SUMMARY OF THE INVENTION

In accordance with this invention the spikes, knives or other mechanism for rupturing or opening the tubes are actuated into engagement with the tubes by hydraulic means which is enabled by a control command mechanism external to the pressure vessel. The hydraulic actuating means includes one or more hydraulic cylinders. In apparatus according to this invention where pressure vessel penetration is a minimum, there is one or more master cylinders in the coolant within the pressure vessel. Each master cylinder includes a piston which may be called a master piston, and is driven linearly by a screw, the screw being driven by a ball nut. The screw and ball nut are in a sealed cavity which is in communication with the inside of the pressure vessel. A stator for driving or rotating a rotor which in turn rotates the ball nut are disposed inside of the cavity but are energizable from outside the cavity. The stator, when energized responsive to command of a control mechanism drives the nut advancing the piston. The ball-nut screw piston drive described above is including in some current reactors and serves to drive the partial control rods. Typical drives are shown in Frisch U.S. Pat. No. 2,882,428 and in Galtz U.S. Pat. No. 3,027,472. Both are incorporated herein by reference. A plurality of master cylinders may drive the knives for rupturing the tubes directly or a single master cylinder may enable pistons, which may be called slave pistons, in slave cylinders to enable the knives to rupture the tubes. The master and slave cylinders cooperate through the movement of hydraulic fluid driven by the master piston through the slave cylinders. The fluid drives the slave pistons. The coolant serves as the hydraulic fluid. Where it is desirable that this invention be incorporated in currently operating reactors, the partial control rods may be replaced by master cylinders and the slave cylinders may be added.

BRIEF DESCRIPTION OF THE DRAWINGS

For a better understanding of this invention, both as to its organization and as to its method of operation, together with additional objects and advantages thereof, reference is made to the following description taken in connection with the accompanying drawings, in which.

DETAILED DESCRIPTION OF THE INVENTION

Figure 1:
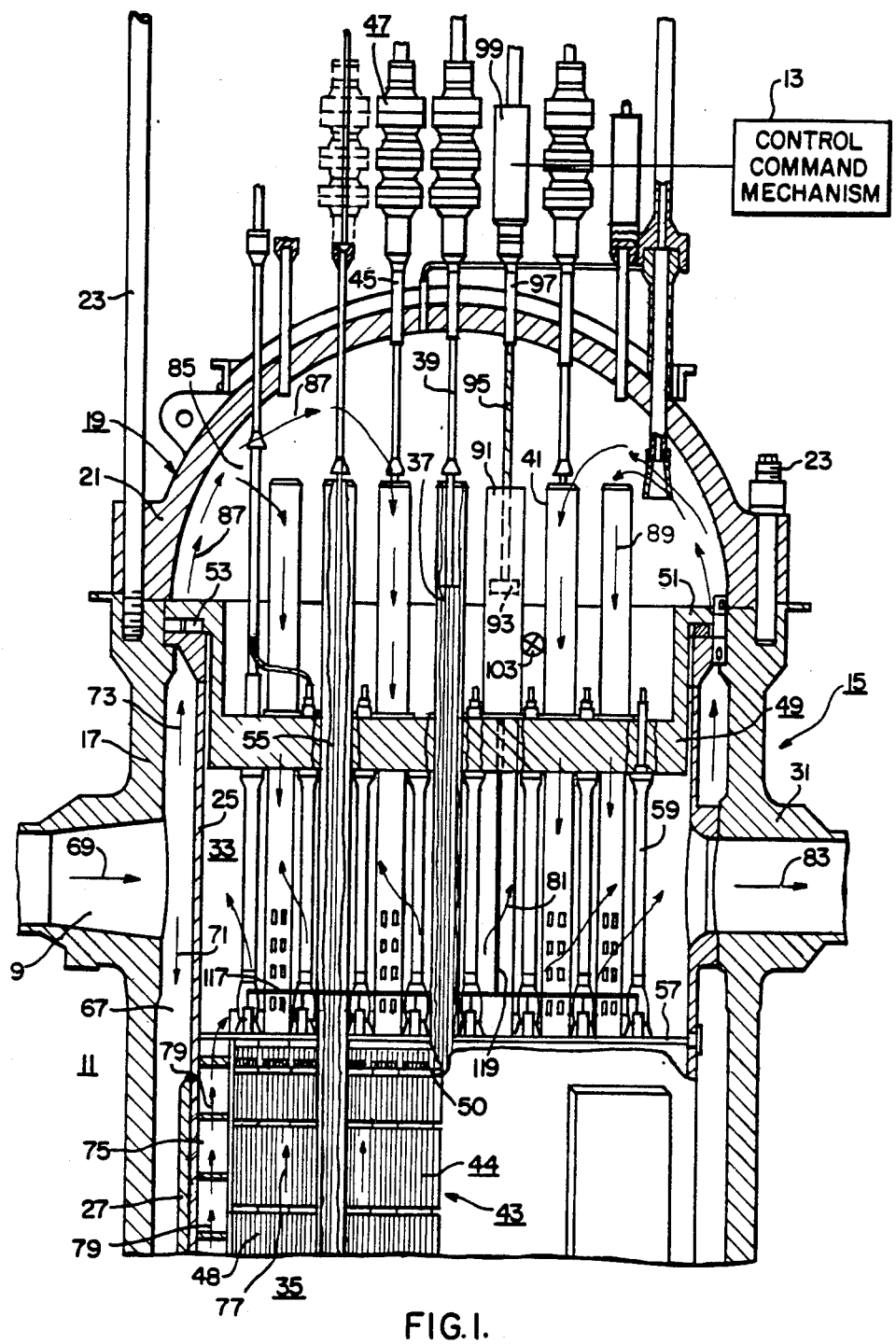
FIG. 1 is a fragmentary view, partly diagrammatic, showing the essential features of this invention.
Figure 2:
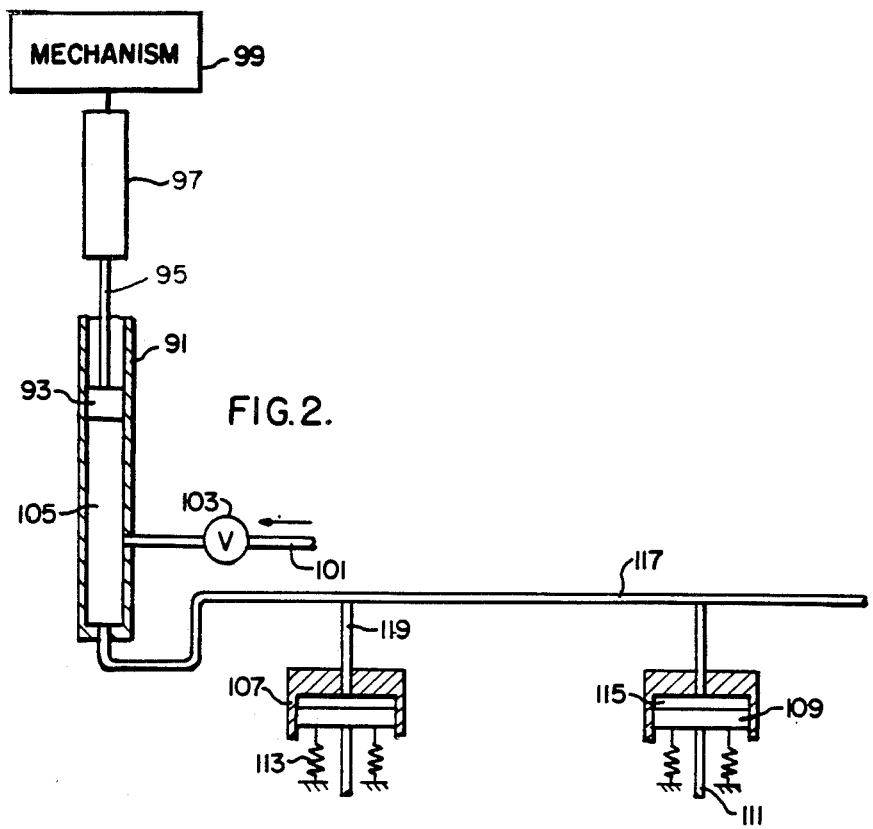
FIG. 2 is a fragmentary view, generally diagrammatic, showing the cooperative relationship of the master and slave cylinders in the practice of an aspect of this invention.
Figure 3:
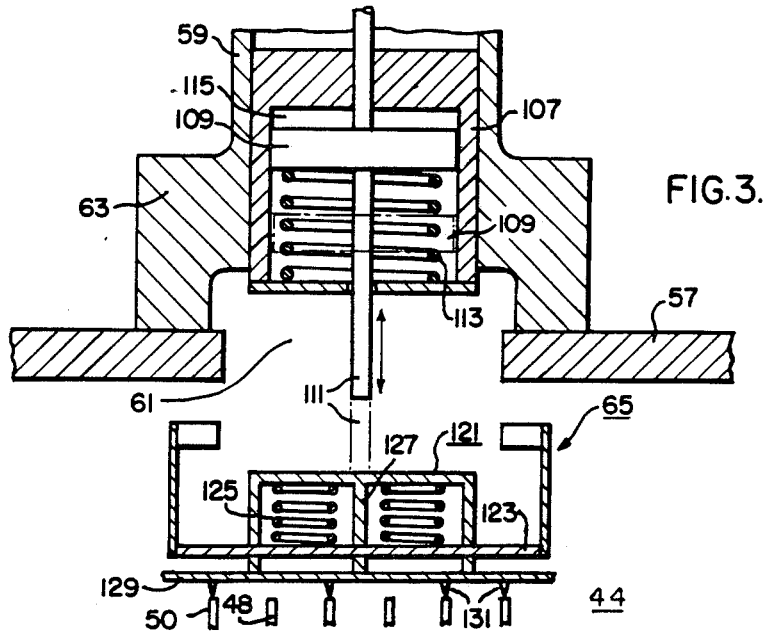
FIG. 3 is a fragmentary view, generally diagrammatic, showing the manner in which the piston of a slave cylinder drives the spikes or knives which rupture the sealed tubes in the practice of this invention.

FIGS. 1, 2, 3 show the essential features of a nuclear reactor system embodying this invention. This system includes a nuclear reactor 11 and a control command mechanism 13 for selectively controlling the spectrum of the neutron flux at the will of an operator. The reactor 11 is shown in longitudinal section, the section being produced by a central plane through the central axis of the reactor 11. The reactor 11 is generally symmetrical about the sectioning plane.

The reactor 11 includes a pressure vessel 15 including a generally circular cylindrical shell 17 and a dome 19. The dome 19 has a flange 21 which engages the upper surface of the shell 15 and is sealed gas-tight to this surface. The flange and shell are secured by bolts 23 and the joint between them is welded.

Within the pressure vessel 15 there is a core barrel 25. A sleeve 27 is screwed onto the lower portion of the core barrel. The shell 17 has inlet and exit openings 29 and 31 for transmitting the coolant through the reactor. Within the reactor there are the upper internals 33 and the lower internals 35.

The upper internals 33 include the control rods 37, the rods 39 which drive the control rods and the thimble or sleeves 41 which guide the control rods 37. The lower internals 35 include the core 43 and its associated parts. The core 43 includes a plurality of fuel assemblies 44. A typical fuel assembly is shown in FIG. 1 of Marlatt patent. The core 43 is within a shell (not shown) which is in turn supported from the core barrel 25. The control rod drives 39 extend through sleeves 45 sealed pressure-tight to the dome 19 into sealed mechanisms 47 which are controlled externally of the pressure vessel 15.

Each fuel assembly 44 includes a plurality of fuel rods 48 (FIG. 3) and in addition a plurality of tubes 50 (FIG. 3) containing a gas such as helium. The fuel assemblies 44 are in this respect similar to the fuel assembly disclosed in Marlatt patent. The tubes 50 are typically composed of Zircaloy alloy. Typically the tops of these tubes are reduced in thickness. The pressure of the helium in these tubes 50 is about the same as the pressure within the fuel rods 48.

The core 43 is held between an upper core support 49 and a lower core support (not shown). The upper core support 49 has a flange 51. A Bellville spring 53 is interposed between flange 51 and the top of the core barrel 25. The thimbles 41 are supported on the upper core support. The upper core support 49 has holes 55 coextensive with the thimbles through which the control rods 37 penetrate into the core 43. A core plate 57 (FIGS. 1 and 3) extends above the core. Hollow columns 59 extend between the core plate and the lower surface of the upper core support 49. As shown in FIG. 1, a plurality of columns 59 may be associated with each fuel assembly 44. The core plate 57 has holes 61 (FIG. 3). The columns 59 are supported on feet 63. Coolant flows through the holes 61 and between the feet 63. Each fuel assembly 44 is mounted between an upper nozzle 65 (FIG. 3) and a lower nozzle (not shown but shown at 26 in Marlatt application).

The coolant, typically from the outlet of the steam generator of the nuclear reactor system, flows into the annulus 67 between the shell 17 and the core barrel 25 through inlet 29, as shown by arrow 69. Then the coolant divides into two branches represented by the arrows 71 and 73. The major portion (arrow 71) of the coolant flows to the bottom of the core barrel, then up through the core through the lower nozzles (not shown) and through the annulus 75 between shell 46 and the core barrel 25 as represented by the arrows 77 and 79. The stream from the core flows through the upper nozzles 65 as represented by the arrows 81 and out through the outlet 31 as represented by the arrow 83. The smaller portion of the coolant represented by the arrow 73 flows into the space 85 between the dome 19 and the upper core support 49 as represented by the arrows 87. This portion flows through the thimbles 41 as represented by the arrows 89 and out through the outlet nozzle 31.

Within the space 85 between the dome 19 and the upper core support there is at least one master cylinder 91 (FIGS. 1, 2). Within the cylinder 91, there is a piston 93 movable upwardly or downwardly by a screw 95. The screw 95 passes through a sleeve 97 (FIG. 1) sealed gas tight through the dome 19 and is connected to a nut (not shown) in a mechanism 99 which is enabled, by control command mechanism 13 external of the reactor 11, to rotate and in rotating to drive the screw. The available movement of the screw may be substantially greater than the desired movement of the piston 93. A channel or pipe 101 (FIG. 2) is connected through a check valve 103 between the space 85 and the inside 105 of the master cylinder 91 under the piston 93. The check valve 103 permits coolant to flow into the inside 105 of the cylinder but prevents the coolant from flowing out.

The reactor 11 includes a plurality of slave cylinders 107 each provided with a piston 109 (FIGS. 2, 3). Each cylinder 107 is mounted at the lower end of the column 59 between the feet 63 of the column. Each piston is provided with a piston rod 11. In each cylinder 107 a spring 113 is provided for retracting the piston 109 and the rod 111. The spaces 115 above the pistons 109 of the slave cylinders 107 are in communication with space 105 below the piston 93 of the master cylinder 91 through cross horizontal fluid conductor 117 (FIGS. 1, 2) and vertical conductors 119. When piston 93 (FIG. 2) is moved downwardly, fluid conducted by conductors 119 and 117 into the spaces 115 moves the pistons 109 and their rods 111 downwardly against the action of springs 113. The piston rod 111 is shown retracted by spring 113 in full lines in FIG. 3 and advanced under the action of the fluid in space 105 in broken lines.

A bracket 121 (FIG. 3) is suspended from an adapter plate 123 in each nozzle 65 by springs 125. The bracket has legs 127 which extend through holes in the adapter plate 123. The legs carry a spike bracket 129 which carries spikes 131 each projecting downwardly towards a tube 50. Each spike may be centered on the top of a tube 50 and spaced a short distance from the top. The spikes are composed of a material capable of resisting the corrosive effects of the coolant. Typically Inconel or Hastaloy alloy may serve this purpose.

In the usual practice of this invention, the control rods 37 are inserted in the core 43 to set the reactor 11 in subcritical state when a change in the neutron energy spectrum is to be produced. Then the control command mechanism 13 is operated to cause the master piston 93 to move downwardly. Hydraulic fluid is injected into the slave cylinders 107 to move the slave pistons 109 and their rods 111 downwardly. Bracket 121 and spike bracket 129 is moved downwardly so that the spikes 131 open the tubes 50. Coolant displaces the gas in the tubes increasing the conversion of epithermal neutrons to thermal neutrons. Since the nuclear reactor system is in subcritical state during the very short interval when the tubes 50 are opened, the facilities for shifting the neutron energy spectrum are fail safe.

In a typical reactor 11, there are about 100 fuel subassemblies. There are about 250 fuel rods 48 in each sub-assembly. Each sub-assembly typically has 20 gas-containing tubes. Typically, a slave cylinder 107 may be associated with each sub-assembly and may carry 20 spikes 131 for opening the tubes 50 in each sub-assembly. The spike brackets 121 may be so set that the spikes 131 are at progressively decreasing distances from the tops of the tubes 50. Only a fraction of the tubes 50 are opened at one time as the bracket travels downwardly. Conveniently, one tube 50 in each subassembly, or about 100 tubes, may be opened at one time.

Typically, the master piston 93 has a diameter of $\frac{1}{4}$ inch and a travel of 40 inches and each slave piston 109 has a diameter of 2 inches and a travel of 1 inch. Typically, the force applicable by the master piston is about 100 pounds. Since the ratio of the areas of the master and slave pistons is 64, the force applied by each slave piston 109 is 6400 pounds. The force applied to each of 100 spikes 131 is 64 pounds. Each spike is sharp. It is a reasonable assumption that the tube-impacting area of each spike is 0.001 inch. The pressure applied to the tops of each of 100 tubes 50 at any time is 64000 pounds per square inch. This pressure is adequate to rupture the tops and open the tubes. One master cylinder is adequate to rupture the tubes 50 and produce the desired shift in neutron energy spectrum.

Figure 4:
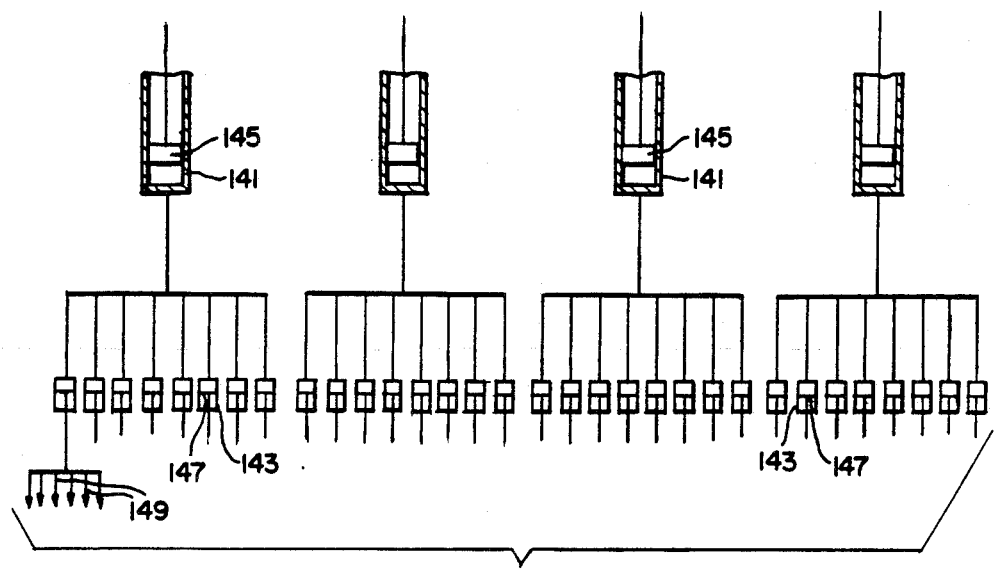
FIG. 4 is a fragmental diagrammatic view showing a modification of this invention in which a plurality of master pistons drive the spikes through associated slave pistons.

In the embodiment shown in FIG. 4, a plurality of master cylinders 141 are provided within the reactor 11. Typically, there may be 12 master cylinders. A pluraltiy of slave cylinders 143 are driven by the piston 145 in each master cylinder 141. The piston 147 in each slave cylinder 143 drives a plurality of spikes 149. The spikes 149 driven by each slave piston 147 may be disposed to puncture the tubes 50 of a subassembly 44.

Figure 5:
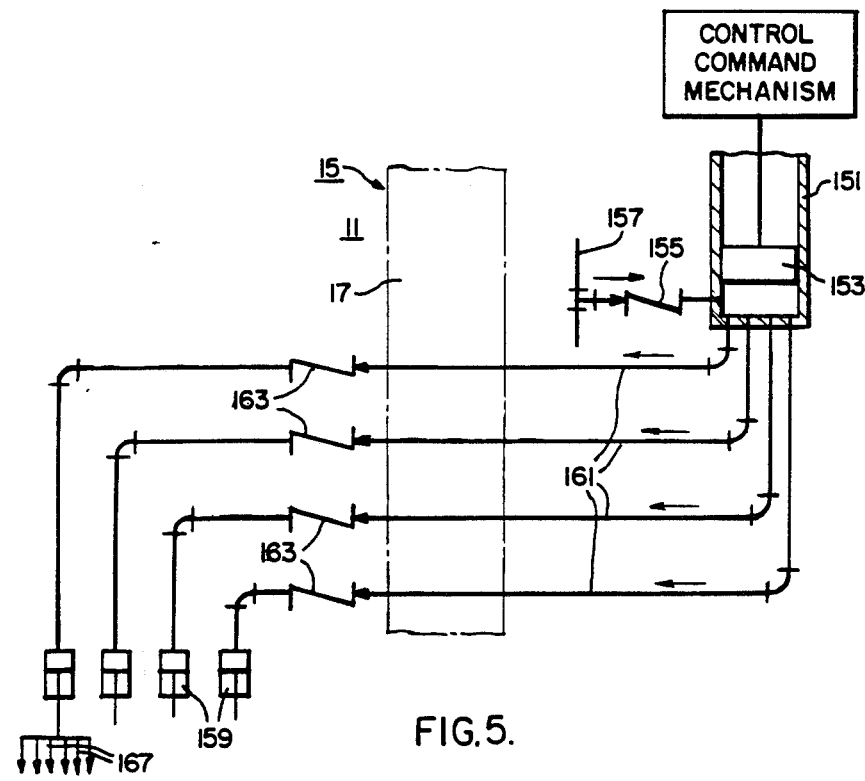
FIG. 5 is a fragmentary diagrammatic view showing a modification of this invention in which a master piston external to the pressure vessel drives slave pistons through selectively set check valves.

In the embodiment shown in FIG. 5, one or more master cylinders 151 is disposed externally to the reactor 11. The hydraulic fluid which the master piston 153 in this master cylinder compresses is derived through a check valve 155 from the conductor 157 through which the coolant of the reactor 11 flows. When compressed by the piston 153 the hydraulic fluid flows to the slave cylinders 159 within the reactor through conductors 161 and check valves 163. The conductors penetrate the shell 17 of the pressure vessel 15. The check valves 163 are within the reactor. The joints between the conductors 161 and the vessel 17 are sealed pressure tight. The check valves 163 are set so that the flow to the slave cylinders 159 is initiated at progressively different positions of the master piston 153. The pistons 165 in the slave cylinders advance spikes 167 to rupture the tubes 50. To accommodate a plurality of conductors 161, the master cylinder should have a diameter larger than $\frac{1}{4}$ inch, typically about 1 inch.

While preferred embodiments of this invention have been disclosed herein, many modifications thereof are feasible. This invention is not to be restricted except insofar as is necessitated by the spirit of the prior art.

I claim:

1. A nuclear reactor system having a nuclear reactor having a core including fuel assemblies, means for transmitting through said core a coolant, said coolant having a predetermined neutron-energy moderating property, a plurality of sealed tubes in said core, each said tube containing a material having a different neutron-energy moderating property than said coolant, means, when actuated, to engage at least certain of said tubes, for opening said certain of said tubes to permit the coolant to replace said material in said tubes thereby to change the energy spectrum of the neutrons in said reactor, hydraulic means, connected to said opening means, for actuating said opening means to engage said certain of said tubes to open said tubes, and means, external to the reactor, connected to said hydraulic means for controlling the actuation of said opening means, said opening means being so set with reference to said tubes that only certain of said tubes are opened at any time as the opening means is advanced towards said tubes by said hydraulic means.

2. A nuclear reactor system having a nuclear reactor having a core including fuel assemblies, means for transmitting through said core a coolant, said coolant having a predetermined neutron-energy moderating property, a plurality of sealed tubes in said core, each said tube containing a material having a different neutron-energy moderating property than said coolant, means, when actuated, to engage at least certain of said tubes, for opening said certain of said tubes to permit the coolant to replace said material in said tubes thereby to change the energy spectrum of the neutrons in said reactor, hydraulic means, connected to said opening means, for actuating said opening means to engage said certain of said tubes to open said tubes, and means, external to the reactor, connected to said hydraulic means for controlling the actuation of said opening means, the hydraulic fluid for driving said hydraulic means being the coolant of said reactor.

3. A nuclear reactor system having a nuclear reactor having a core including fuel assemblies, means for transmitting through said core a coolant, said coolant having a predetermined neutron-energy moderating property, a plurality of sealed tubes in said core, each said tube containing a material having a different neutron-energy moderating property than said coolant, means, when actuated, to engage at least certain of said tubes, for opening said certain of said tubes to permit the coolant to replace said material in said tubes thereby to change the energy spectrum of the neutrons in said reactor, hydraulic means, connected to said opening means, for actuating said opening means to engage said certain of said tubes to open said tubes, and means, external to the reactor, connected to said hydraulic means for controlling the actuation of said opening means, said hydraulic means including a master cylinder, containing an hydraulic fluid, a master piston movable in said master cylinder to compress said hydraulic fluid, a plurality of slave cylinders, means, connected to said master cylinder, and responsive to the fluid compressed by said master piston, for transmitting fluid to said slave cylinders on movement of said master piston, a slave piston in each of said slave cylinders movable under the pressure of the fluid transmitted to each slave piston, and means, connected to each said slave piston, for actuating the opening means associated with said each of said slave piston.

4. A nuclear reactor system having a nuclear reactor having a core including fuel assemblies, means for transmitting through said core a coolant, said coolant having a predetermined neutron-energy moderating property, a plurality of sealed tubes in said core, each said tube containing a material having a different neutron-energy moderating property than said coolant, means, when actuated, to engage at least certain of said tubes, for opening said certain of said tubes to permit the coolant to replace said material in said tubes thereby to change the energy spectrum of the neutrons in said reactor, hydraulic means, connected to said opening means, for actuating said opening means to engage said certain of said tubes to open said tubes, and means, external to the reactor, connected to said hydraulic means for controlling the actuation of said opening means, said hydraulic means including at least one cylinder containing an hydraulic fluid, a piston movable in said cylinder to compress the hydraulic fluid in said cylinder, and means, connecting said piston to said opening means, for actuating said opening means on movement of said piston.

5. The nuclear-reactor system of claim 4 wherein the cylinder is disposed within the nuclear reactors in contact with the coolant, the said cylinder including a channel including a check valve for connecting the inside of the cylinder with the coolant so that the coolant flows into said cylinder and becomes the hydraulic fluid within the cylinder, said check valve being set so that as to permit flow of said coolant into the inside of said cylinder under the pressure of the coolant outside of said cylinder and to prevent flow of said coolant from inside of said cylinder as the pressure of the coolant inside said cylinder increases under the action of said piston.

6. A nuclear reactor system having a nuclear reactor having a core including fuel assemblies, means for transmitting through said core a coolant, said coolant having a predetermined neutron-energy moderating property, a plurality of sealed tubes in said core, each said tube containing a material having a different neutron-energy moderating property than said coolant, means, when actuated, to engage at least certain of said tubes, for opening said certain of said tubes to permit the coolant to replace said material in said tubes thereby to change the energy spectrum of the neutrons in said reactor, hydraulic means, connected to said opening means, for actuating said opening means to engage said certain of said tubes to open said tubes, and means, external to the reactor, connected to said hydraulic means for controlling the actuation of said opening means, said opening means including means, having a plurality of tube-perforating means, each of said tube-perforating means being displaced with respect to a corresponding tube but being advanced, by actuation by said hydraulic means, into engagement with said corresponding tube to open said corresponding tube.

7. The nuclear reactor system of claim 6 wherein the tube-perforating means are displaced at progressively decreasing distances from their corresponding tubes so that only selected tubes are opened at any time as the tube perforating means are advanced a predetermined distance towards the tubes by the hydraulic means.

* * * * *